(12) United States Patent
Gha et al.

(10) Patent No.: US 8,811,375 B2
(45) Date of Patent: *Aug. 19, 2014

(54) MULTIMEDIA APPARATUS AND SYNCHRONIZATION METHOD THEREOF

(75) Inventors: Hwang-hyeon Gha, Suwon-si (KR); Byeong-woon Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

This patent is subject to a terminal disclaimer.

(21) Appl. No.: 13/471,173

(22) Filed: May 14, 2012

(65) Prior Publication Data

US 2012/0224100 A1 Sep. 6, 2012

Related U.S. Application Data

(63) Continuation of application No. 12/138,613, filed on Jun. 13, 2008, now Pat. No. 8,199,780.

(30) Foreign Application Priority Data

Nov. 22, 2007 (KR) ........................ 10-2007-0119817

(51) Int. Cl.
*H04W 56/00* (2009.01)

(52) U.S. Cl.
USPC ............................ 370/350; 370/519; 455/3.06

(58) Field of Classification Search
CPC ... H04W 56/00; H04N 21/4307; H04J 3/0682

USPC ......... 370/517, 519, 419, 420, 412, 503, 328, 370/329, 508, 509, 513, 514, 350; 455/41.2, 411, 6.01, 3.06

See application file for complete search history.

(56) References Cited

U.S. PATENT DOCUMENTS

| | | | |
|---|---|---|---|
| 7,088,832 B1 | 8/2006 | Cooper | |
| 7,324,462 B1 | 1/2008 | Page et al. | |
| 7,365,766 B1 * | 4/2008 | Lapalme | 348/61 |
| 7,480,008 B2 | 1/2009 | Kim | |
| 7,634,227 B2 * | 12/2009 | de Jong | 455/3.06 |
| 7,653,344 B1 | 1/2010 | Feldman et al. | |
| 8,199,780 B2 * | 6/2012 | Gha et al. | 370/517 |
| 8,325,930 B2 * | 12/2012 | Kim et al. | 381/2 |

(Continued)

FOREIGN PATENT DOCUMENTS

| | | |
|---|---|---|
| EP | 1 619 902 A2 | 1/2006 |
| EP | 1 657 929 A1 | 5/2006 |

(Continued)

OTHER PUBLICATIONS

Communication from the European Patent Office dated Mar. 16, 2010, in European Application No. 08153638.5.

(Continued)

*Primary Examiner* — Hanh N Nguyen
(74) *Attorney, Agent, or Firm* — Sughrue Mion, PLLC

(57) ABSTRACT

A multimedia apparatus and a synchronization method thereof are provided. The multimedia apparatus includes a video output unit which outputs a video, and a control unit which transmits an audio signal to the external device through the communication module and operates the video output unit to display a video corresponding to the audio signal by delaying the video based on delay information received from the external device through the communication module.

10 Claims, 3 Drawing Sheets

(56) References Cited

U.S. PATENT DOCUMENTS

| | | |
|---|---|---|
| 2003/0193616 A1 | 10/2003 | Baker et al. |
| 2004/0139180 A1 | 7/2004 | White et al. |
| 2006/0017846 A1 | 1/2006 | Kim |
| 2006/0140265 A1 | 6/2006 | Igler et al. |
| 2006/0217061 A1 | 9/2006 | Steele et al. |
| 2007/0110110 A1 | 5/2007 | Miki et al. |
| 2007/0211624 A1 | 9/2007 | Schmidt |
| 2007/0232222 A1 | 10/2007 | de Jong |
| 2008/0138032 A1* | 6/2008 | Leyendecker et al. .......... 386/66 |
| 2009/0033390 A1 | 2/2009 | Kim et al. |
| 2009/0091655 A1 | 4/2009 | Russell et al. |
| 2009/0135856 A1 | 5/2009 | Gha et al. |

FOREIGN PATENT DOCUMENTS

| | | |
|---|---|---|
| JP | 2004282667 A | 10/2004 |
| JP | 2004-320424 A | 11/2004 |
| KR | 1020060068465 A | 6/2006 |
| KR | 10-2006-0080606 A | 7/2006 |
| KR | 100651894 B1 | 12/2006 |

OTHER PUBLICATIONS

Communication dated Aug. 17, 2011 issued by the European Patent Office in European Patent Application No. 08153638.5.

Communication dated Dec. 29, 2011 issued by the U.S. Patent Office in U.S. Appl. No. 12/045,282.

Communication dated Jan. 31, 2013 from the European Patent Office in counterpart application No. 08164215.9.

Sairam et al., "Bluteooth in Wireless Communication", IEEE Communications Magazine, IEEE Service Center, vol. 40, No. 6, Jun. 1, 2002, pp. 90-96.

Communication dated Oct. 18, 2013, issued by the Korean Intellectual Property Office in counterpart Korean Application No. 10-2007-0119817.

Communication dated Oct. 17, 2013, issued by the Korean Intellectual Property Office in counterpart Korean Application No. 10-2007-0077432.

* cited by examiner

FIG. 3

| Item | Definition | Type | Value | AttrID | Status | Default |
|---|---|---|---|---|---|---|
| Service Class ID List | | | | | M | |
| Service Class #0 | | UUID | Audio Sink | | M | |
| Protocol Descriptor List | | | | | M | |
| Protocol #0 | | UUID | L2CAP | | M | |
| Parameter #0 for Protocol #0 | PSM | Unit 16 | PSM=AVDTP | | M | |
| Protocol #1 | | Type | AVDTP | | M | |
| Parameter #0 for Protocol #1 | Version | Unit 16 | 0x0100 * | | M | |
| Bluetooth Profile Descriptor List | | | | | M | |
| Parameter #0 for Protocol #0 | | UUID | Advanced Audio Distribution | | M | |
| Parameter #0 for Protocol #0 | Version | Unit 16 | 0x0100 *¹ | | M | |
| Supported Features | A2DP features Flags | Unit 16 | Bit 0=Headphone Bit 1=Speaker Bit 2=Recorder Bit 3=Amplifier Bit 4-15 = RFA  The bits for supported features are set to 1. Others are set to 0. | | O | |
| Provider Name | Displayable Text Name | String | Provider Name | | O | |
| Service Name | Displayable Text Name | String | Service-provider defined | | O | |

MULTIMEDIA APPARATUS AND SYNCHRONIZATION METHOD THEREOF

CROSS-REFERENCE TO RELATED APPLICATIONS

This application is a continuation of Ser. No. 12/138,613 filed Jun. 13, 2008, and claims priority from Korean Patent Application No. 10-2007-0119817, filed Nov. 22, 2007 in the Korean Intellectual Property Office, the disclosures of which are incorporated herein by reference in their entireties.

BACKGROUND OF THE INVENTION

1. Field of the Invention

Apparatuses and methods consistent with the present invention relate to a multimedia device and a synchronization method thereof, and more particularly, to synchronizing audio signals and video signals when reproducing images.

2. Description of the Related Art

As multimedia technology has developed, multimedia apparatuses for supporting diverse functions using a single device have been introduced. Such multimedia apparatuses provide not only audio and video recording and playback functions, but also data storage, message transmission, and call functions, such as calling mobile phones. Examples of multimedia apparatuses for recording and reproducing images and broadcast signals received from broadcast stations include a digital television (DTV), a portable multimedia player (PMP), a camcorder, a digital camera, a digital video disc (DVD) player, a set-top box (STB), and a mobile phone.

When a related art multimedia apparatus communicates with a headset using the Bluetooth protocol, the time that video is reproduced is different from the time that audio is reproduced by the headset. Specifically, since there is a delay between the time an audio signal is transmitted from the multimedia apparatus and the time the signal is output through a speaker of the headset, the audio signal and a corresponding video signal are not synchronized. In particular, if a buffer provided by the headset is large, the delay is greater, so the synchronization difference between a video signal reproduced by the multimedia apparatus and an audio signal reproduced by the headset increases, causing inconvenience to the user.

Therefore, there is a need for apparatuses and methods for synchronizing audio signals and video signals when a multimedia apparatus reproduces images.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides a multimedia apparatus which is capable of outputting synchronized audio signals and video signals by extracting delay information by analyzing a service record acquired using the Bluetooth protocol and synchronizing the audio signals and video signals based on the extracted delay information, and a synchronization method thereof.

Another aspect of the present invention provides a multimedia apparatus which is capable of outputting synchronized audio signals and video signals using delay information acquired from an external device, and a synchronization method thereof.

According to an exemplary aspect of the present invention, there is provided a multimedia apparatus, including a communication module which is connected to an external device for wireless communication, a video output unit which outputs a video, and a control unit which transmits an audio signal to the external device through the communication module, and operates the video output unit to display a video corresponding to the audio signal by delaying the video based on delay information received from the external device through the communication module.

The delay information may be contained in a Reserved for Future Addition (RFA) area of the service record received from the external device, and the control unit delays the video for a delay time contained in the delay information acquired from the RFA area, and then outputs the delayed video to the video output unit.

The delay information may refer to a data set in the $4^{th}$ to $15^{th}$ bits of the RFA area, and the control unit may calculate the delay time based on the data set in the $4^{th}$ to $15^{th}$ bits of the RFA area, and delay the video based on the calculated delay time.

At least one bit of the $4^{th}$ to $15^{th}$ bits of the RFA area may be used to set data indicating a delay unit, and the remaining bits except for the at least one bit may be used to set data indicating the delay time.

The service record may be contained in an advanced audio distribution profile (A2DP) which is used in Bluetooth communication.

The Bluetooth module may acquire the service record by Bluetooth communication with the external device using a service discovery protocol (SDP).

According to another exemplary aspect of the present invention, there is provided a synchronization method of a multimedia apparatus, the method including receiving delay information by wireless communication with an external device, and transmitting an audio signal to the external device, and displaying a video corresponding to the audio signal by delaying the video based on the delay information received from the external device.

The wireless communication may be Bluetooth communication, and the delay information may be contained in a service record received from the external device.

The delay information may be contained in an RFA area of a packet received from the external device, and in the delay operation, the video may be delayed for a delay time contained in the delay information acquired from the RFA area, and then output.

The delay information may refer to data set in the $4^{th}$ to $15^{th}$ bits of the RFA area, and in the delay operation, the delay time may be calculated based on the data set in the $4^{th}$ to $15^{th}$ bits of the RFA area, and the video may be delayed based on the calculated delay time.

At least one bit of the $4^{th}$ to $15^{th}$ bits of the RFA area may be used to set data indicating a delay unit, and the remaining bits except for the at least one bit may be used to set data indicating the delay time.

The service record may be contained in an advanced audio distribution profile (A2DP) using Bluetooth communication.

The wireless communication may be Bluetooth communication, and in the receiving operation, the service record may be acquired by Bluetooth communication with the external device using a service discovery protocol (SDP).

According to another exemplary aspect of the present invention, there is provided an audio output apparatus, including an interface unit which receives an audio signal from an external device, and a control unit which sets delay information based on the period of time taken to output the audio signal.

The period of time taken to output the audio signal may indicate a period of time from when the audio signal is received until the audio signal is output, and the control unit may measure the period of time from when the audio signal is received until when the audio signal is output, and set the delay information based on the measured period of time.

The control unit may set the delay information, and transmit the set delay information to the external device through the interface unit.

The delay information may include at least one of a delay time and a delay unit.

According to another exemplary aspect of the present invention, there is provided a multimedia apparatus, including a communication module which is connected to an external device for wireless communication, an audio output unit which outputs an audio signal, and a control unit which transmits a video signal to the external device through the communication module, and operates the audio output unit to display an audio signal corresponding to the video signal by delaying the audio signal based on delay information received from the external device through the communication module.

BRIEF DESCRIPTION OF THE DRAWINGS

The above and/or other aspects of the present invention will be more apparent by describing certain exemplary embodiments of the present invention with reference to the accompanying drawings, in which:

FIG. 3 is a drawing illustrating an example of the construction of a service record according to an exemplary embodiment of the present invention;

DETAILED DESCRIPTION OF EXEMPLARY EMBODIMENTS

Figure 1:
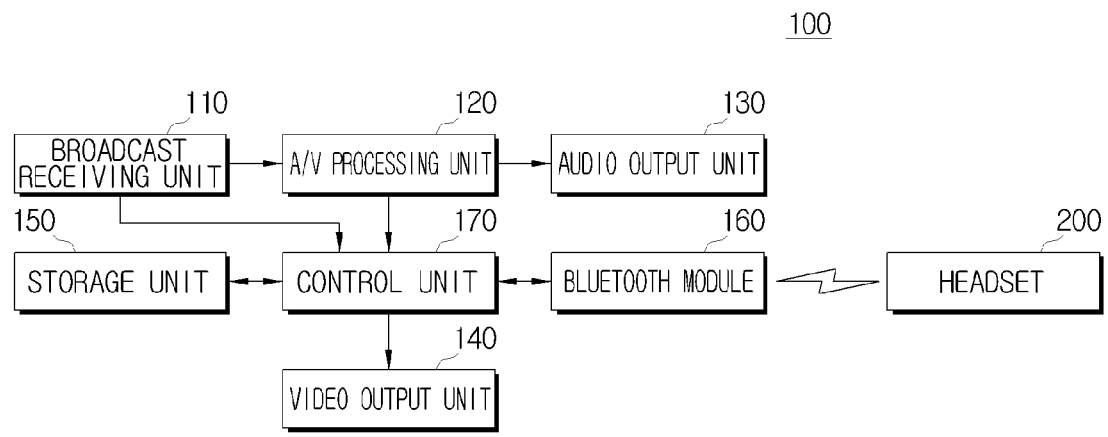
FIG. 1 is a block diagram of a multimedia apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a block diagram of a multimedia apparatus according to an exemplary embodiment of the present invention.

With reference to FIG. 1, the multimedia apparatus 100 according to an exemplary embodiment of the present invention includes a broadcast receiving unit 110, an audio/video (A/V) processing unit 120, an audio output unit 130, a video output unit 140, a storage unit 150, a Bluetooth module 160, and a control unit 170.

The broadcast receiving unit 110 receives and demodulates a broadcast from a broadcast station or a satellite via a wire connection or wirelessly. The broadcast receiving unit 110 also receives content from a broadcast station or a satellite. The content includes moving images, still images, broadcast programs, or audio data.

The A/V processing unit 120 performs video decoding, video scaling or audio decoding of broadcast signals output from the broadcast receiving unit 110. Subsequently, the A/V processing unit 120 transmits video signals to the control unit 170, and audio signals to the audio output unit 130 and the control unit 170.

The audio output unit 130 outputs the audio signals received from the A/V processing unit 120 through a speaker.

The video output unit 140 outputs video received from the control unit 170 on a display, or outputs the video to an external device to which the multimedia apparatus 100 is connected through an external output terminal.

The storage unit 150 stores broadcast data processed by the A/V processing unit 120 or programs, software code, instructions and the like required to control the elements constituting the multimedia apparatus 100.

The Bluetooth module 160 converts audio signals received from the control unit 170 to a format for Bluetooth communication, and converts data received from the headset 200 to a format capable of being processed by the multimedia apparatus 100.

The control unit 170 transmits audio signals received from the A/V processing unit 120 to the Bluetooth module 160, and extracts delay information from a service record received from the headset 200 using the Bluetooth module 160. The control unit 170 delays video signals output from the A/V processing unit 120 according to a delay time contained in the extracted delay information, and displays the delayed video signals through the video output unit 140.

The delay information includes at least one of a delay time and a delay unit, which is a unit of the delayed time. The service record is contained in an advanced audio distribution profile (A2DP) which is a profile used for transmission and reception of audio data in Bluetooth communication. The multimedia apparatus 100 performs Bluetooth communication with the headset 200 using a service discovery protocol (SDP).

Figure 2:
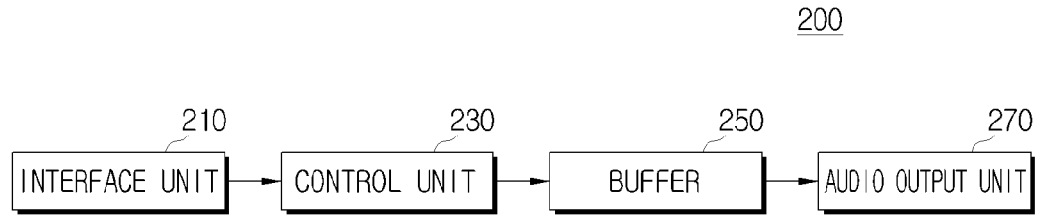
FIG. 2 is a block diagram of a headset according to an exemplary embodiment of the present invention.

FIG. 2 is a block diagram of a headset according to an exemplary embodiment of the present invention.

With reference to FIG. 2, the headset 200 includes an interface unit 210, a control unit 230, a buffer 250, and an audio output unit 270. The headset 200 supports Bluetooth communication, and performs wireless communication with the multimedia apparatus 100.

The interface unit 210 receives audio signals from the multimedia apparatus 100 using Bluetooth communication. The multimedia apparatus 100 performs Bluetooth communication with the headset 200 using an SDP.

The control unit 230 buffers the received audio signals using the buffer 250. The control unit 230 measures the time from the time that the audio signals are received until the time that the audio signals are output from the audio output unit 270, and generates delay information based on the measured time. As explained in greater detail below with reference to FIGS. 3 and 4, the control unit 230 contains the delay information in a Reserved for Future Addition (RFA) area contained in a service record. The delay information includes at least one of a delay time and a delay unit which may include at least one of seconds, milliseconds, microseconds, and nanoseconds.

More specifically, the control unit 230 sets the delay information in bits 4 to 15 of the service record which is predetermined as an RFA as shown in FIG. 3.

For example, if the time from when the audio signals are received until the audio signals are output from the audio output unit 270 is measured at 10 seconds, the control unit 230 sets delay information including a delay time of 10 seconds and a delay unit "seconds" in the RFA area. More specifically, the control unit 230 sets the delay time as "1010", which is a delay time of 10 converted into binary code, and sets the delay unit as "00".

Figure 4:
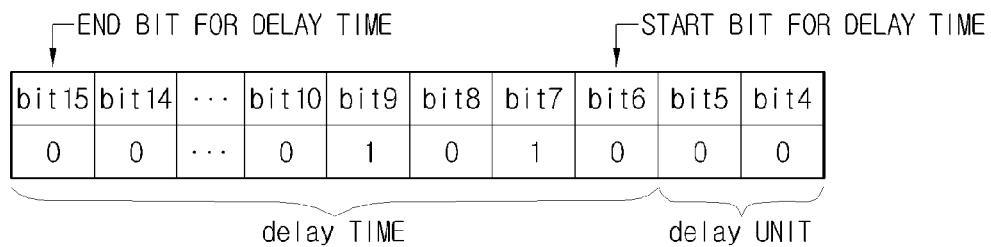
FIG. 4 is a drawing illustrating an example of an RFA area in which delay information is set according to an exemplary embodiment of the present invention.

As shown in FIG. 4, the control unit 230 uses bits 4 and 5 as the bits for the delay unit, and uses bits 6 to 15 as the bits for the delay time. That is, the control unit 230 sets the delay time by setting bits 15 to 10, bit 8, and bit 6 to "0" and bits 7 and 9 to "1". In addition, the control unit 230 sets the delay unit by setting bits 5 and 4 to "0". The delay unit is set as shown in Table 1.

TABLE 1

| Bit 5 | Bit 4 | Value |
|---|---|---|
| 0 | 0 | sec (second) |
| 0 | 1 | msec (millisecond) |
| 1 | 0 | μsec (microsecond) |
| 1 | 1 | ns (nanosecond) |

The audio output unit 270 outputs the audio signals from the buffer 250 through a speaker mounted in the headset 200.

Figure 5:
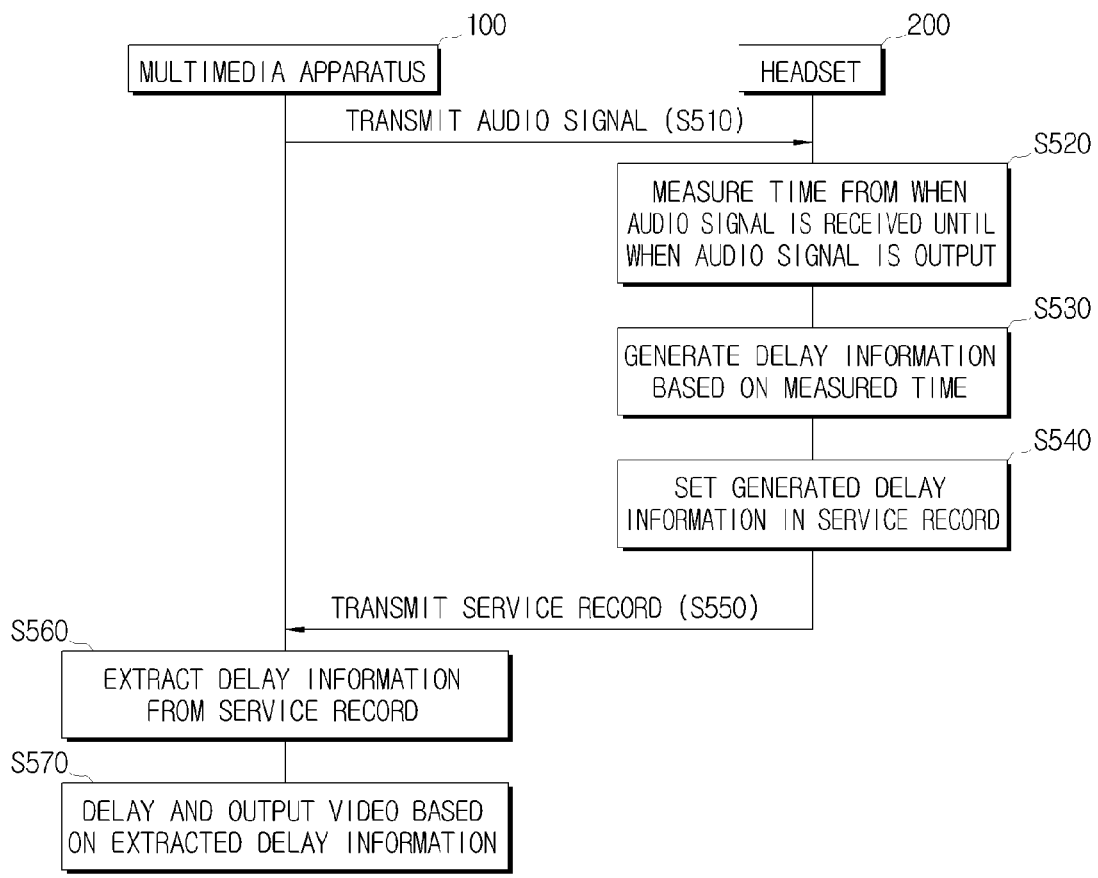
FIG. 5 is a flow chart illustrating a method for synchronizing audio and video signals between a multimedia apparatus and a headset according to an exemplary embodiment of the present invention.

FIG. 5 is a flow chart illustrating a method for synchronizing audio signals and video signals between a multimedia apparatus and a headset according to an exemplary embodiment of the present invention.

With reference to FIG. 5, the multimedia apparatus 100 transmits to the headset 200 an audio signal corresponding to a video signal to be displayed (S510). The multimedia apparatus 100 transmits the audio signal to the headset 200 by Bluetooth communication using an SDP protocol.

The control unit 230 of the headset 200 measures from the time that the audio signal is received until the time that the audio signal is output to the speaker mounted in the headset 200 (S520).

Subsequently, the control unit 230 of the headset 200 generates delay information based on the measured time. The delay information may include a delay time and a delay unit, which may include at least one of seconds, milliseconds, microseconds, and nanoseconds.

In greater detail, the control unit 230 sets the delay time by converting the measured time to binary code, and sets the unit of the measured time as a delay unit.

Subsequently, the control unit 230 sets the generated delay information in a service record (S540). The service record is contained in an A2DP, which is a profile used for transmission and reception of audio data.

More specifically, the control unit 230 sets the generated delay information in the RFA area contained in the service record, wherein the control unit 230 allocates two bits of the RFA area to a delay unit, and the remaining bits of the RFA area to a delay time. The RFA area includes bits 4 to 15.

The interface unit 210 of the headset 200 transmits the service record to the multimedia apparatus 100 using the Bluetooth communication (S550).

The control unit 170 of the multimedia apparatus 100 extracts the delay information contained in the received service record (S560).

Subsequently, the control unit 170 delays and outputs the video signal based on the extracted delay information (S570).

For example, if the delay time in the extracted delay information is 10 seconds, the control unit 170 delays a video signal corresponding to the audio signal transmitted in operation S510 for 10 seconds, and then outputs the video signal. Accordingly, the control unit 230 may synchronize the video signal output from the multimedia apparatus 100 with the audio signal output from the headset 200.

In a multimedia apparatus and a synchronization method thereof according to an exemplary embodiment, the delay information includes a delay time and a delay unit, but the delay information is not limited thereto. In another exemplary embodiment, the delay unit may be predetermined, so that the delay information may include only a delay time. That is, the 12 bits of the RFA area may be used as the bits for setting the delay time.

In a headset according to an exemplary embodiment of the present invention, a delay unit accounts for 2 bits of the RFA area and a delay time accounts for 10 bits, but the present invention is not limited to such a configuration. A delay unit may account for 1 bit or more than 2 bits. The remaining bits except for the bits allocated to the delay unit may be used for setting the delay time.

In a headset according to an exemplary embodiment of the present invention, bits 4 and 5 of the RFA area are used to set a delay unit and bits 6 to 15 are used to set a delay time, but the present invention is not limited to such a configuration. One or more of bits 4 to 15 may be used to set a delay unit. The remaining bits other than the bits for setting the delay unit may be used to set a delay time.

In a multimedia apparatus and a synchronization method thereof according to an exemplary embodiment of the present invention, the multimedia apparatus transmits data to and receives data from a headset using Bluetooth communication, but the communication means is not limited thereto. The multimedia apparatus may transmit data to and receive data from the headset by wireless communication.

In a multimedia apparatus and a synchronization method thereof according to an exemplary embodiment of the present invention, the multimedia apparatus acquires delay information from a service record received from a headset, but the present invention is not limited to such a configuration. The multimedia apparatus may acquire the delay information from a packet received from the headset other than the service record. That is, the delay information may be contained in a packet received from the headset other than the service record.

In a headset according to an exemplary embodiment of the present invention, a delay time is calculated by measuring from the time that an audio signal is received from a multimedia apparatus until the time that the audio signal is output, but it is not limited thereto. The delay time may be calculated as the period of time taken to output the audio signal by the headset.

That is, the delay time may refer to the time from when an audio signal is input from one of the elements of the headset until the audio signal is output from another element. In this case, a control unit may calculate the time from when an audio signal is input to a buffer until the audio signal is output from the buffer. That is, the control unit may calculate the delay time by measuring the time during which an audio signal is input to and output from one of the elements of the headset.

In a multimedia apparatus and a synchronization method thereof according to an exemplary embodiment of the present invention, the multimedia apparatus delays an image signal based on delay information of an audio signal, but the present invention is not limited thereto. The multimedia apparatus may delay an audio signal corresponding to an image signal based on the delay information.

The foregoing exemplary embodiments are merely exemplary and are not to be construed as limiting the present invention. The present teaching may be readily applied to other types of apparatuses. Also, the description of the exemplary embodiments of the present invention is intended to be illustrative, and not to limit the scope of the claims, and many alternatives, modifications, and variations will be apparent to those skilled in the art.

As may be appreciated from the above description, image signals output from a multimedia apparatus may be synchronized with audio signals output from a headset by delaying image signals based on delay information extracted from a received service record.

Audio signals and image signals may be synchronized using delay information acquired from an external device.

What is claimed is:

1. An audio output apparatus comprising:
   a communication module which is communicably linked to an external device for wireless communication;
   an audio output unit which outputs an audio signal; and
   a control unit which receives the audio signal from the external device through the communication module, determines delay information as a period of time from when a video signal is received by the external device until the video signal is output by the external device, and operates the audio output unit to output the audio signal corresponding to the video signal displayed on the external device by delaying the audio signal based on the delay information.

2. The audio output apparatus of claim 1 wherein the control unit measures the period of time from when the video signal is received until the video signal is output, and sets the delay information based on the measured period of time.

3. The audio output apparatus of claim 1, wherein the control unit sets the delay information and transmits the set delay information to the external device through the interface unit.

4. The audio output apparatus of claim 1, wherein the delay information comprises at least one of a delay time and a delay unit.

5. The audio output apparatus of claim 1, wherein the delay information is contained in a reserved area of a service record transmitted to the external device.

6. A method comprising:
   receiving an audio signal from an external device;
   determining delay information as a period of time from when a video signal is received by the external device until the video signal is output by the external device; and
   outputting the audio signal corresponding to the video signal displayed on the external device by delaying the audio signal based on the delay information.

7. The method of claim 6, wherein the determining the delay information comprises:
   measuring the period of time from when the video signal is received until the video signal is output; and
   setting the delay information based on the measured period of time.

8. The method of claim 6, further comprising transmitting the set delay information to the external device through an interface unit.

9. The method of claim 6, wherein the delay information comprises at least one of a delay time and a delay unit.

10. The method of claim 6, wherein the delay information is contained in a reserved area of a service record transmitted to the external device.

* * * * *